US009765746B2

(12) United States Patent
Ghoneim et al.

(10) Patent No.: US 9,765,746 B2
(45) Date of Patent: Sep. 19, 2017

(54) METHOD AND APPARATUS TO EVALUATE A STARTER FOR AN INTERNAL COMBUSTION ENGINE

(71) Applicant: GM GLOBAL TECHNOLOGY OPERATIONS LLC, Detroit, MI (US)

(72) Inventors: Youssef A. Ghoneim, Rochester, MI (US); Mark N. Howell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/242,413

(22) Filed: Aug. 19, 2016

(65) Prior Publication Data

US 2016/0356254 A1 Dec. 8, 2016

Related U.S. Application Data

(62) Division of application No. 14/333,732, filed on Jul. 17, 2014, now Pat. No. 9,458,815.

(51) Int. Cl.

| | |
|---|---|
| ***G06F 7/00*** | (2006.01) |
| ***F02N 11/10*** | (2006.01) |
| ***F02N 11/08*** | (2006.01) |
| ***F02N 15/06*** | (2006.01) |
| *F02N 11/00* | (2006.01) |

(52) U.S. Cl.

CPC ........ *F02N 11/108* (2013.01); *F02N 11/0851* (2013.01); *F02N 15/067* (2013.01); *F02N 11/00* (2013.01); *F02N 2200/044* (2013.01); *F02N 2200/045* (2013.01); *F02N 2200/046* (2013.01); *F02N 2200/047* (2013.01); *F02N 2300/304* (2013.01)

(58) Field of Classification Search

CPC ............. F02N 11/108; F02N 2200/022; F02N 11/0825; F02N 11/087; F02N 2200/062; F02N 2200/063; F02N 2200/023; F02N 2200/046; F02N 11/0848; F02N 15/067; F02N 2200/041; F02N 2200/044; F02N 11/04; F02N 11/0851

USPC .......................................................... 701/34.4

See application file for complete search history.

(56) References Cited

U.S. PATENT DOCUMENTS

| | | | | |
|---|---|---|---|---|
| 6,633,153 | B1 * | 10/2003 | Blackburn | H02J 7/0031 320/130 |
| 7,743,649 | B1 | 6/2010 | Salman et al. | |
| 8,055,460 | B2 | 11/2011 | Rajagopalan et al. | |
| 8,234,036 | B2 | 7/2012 | Shin et al. | |
| 8,380,388 | B2 * | 2/2013 | Shin | F02N 11/108 701/29.1 |
| 2008/0067817 | A1 * | 3/2008 | Remele | F02D 41/22 290/40 R |

(Continued)

*Primary Examiner* — Muhammad Shafi

(57) ABSTRACT

An internal combustion engine including a starter is shown. A method for monitoring the starter includes determining electrical energy consumed by pinion and motor solenoids operative to activate and rotate a pinion gear of an electrically-powered motor meshingly engageable to a starter ring gear portion of a flywheel of the engine during an engine starting event. Current ringing in the pinion and motor solenoids is monitored during the engine starting even, and a fault is identified in the pinion and motor solenoids based upon the current ringing and the electrical energy consumption of the starter during the engine starting event.

7 Claims, 9 Drawing Sheets

(56) References Cited

U.S. PATENT DOCUMENTS

| | | | | |
|---|---|---|---|---|
| 2013/0046435 | A1 | 2/2013 | Shin et al. | |
| 2014/0067247 | A1* | 3/2014 | Chasse | B60W 20/12 701/123 |

* cited by examiner

| | | | |
|---|---|---|---|
| ▧ (cross-hatched) | 140.4 | 106.7 | 136.5 |
| ▩ (dotted) | 145.7 | 99.56 | 143.1 |
| ▨ (hatched) | 141.4 | 98.96 | 146.6 |

| | | | |
|---|---|---|---|
| ▧ (cross-hatched) | 0.4168 | 0.595 | 0.4671 |
| ▩ (dotted) | 0.4154 | 0.6146 | 0.4377 |
| ▨ (hatched) | 0.4194 | 0.6263 | 0.4246 |

METHOD AND APPARATUS TO EVALUATE A STARTER FOR AN INTERNAL COMBUSTION ENGINE

CROSS REFERENCE TO RELATED APPLICATIONS

This application is a divisional application of U.S. application Ser. No. 14/333,732 filed on Jul. 17, 2014. U.S. application Ser. No. 14/333,732 is incorporated herein by reference.

TECHNICAL FIELD

This disclosure is related to starting systems for internal combustion engines.

BACKGROUND

The statements in this section merely provide background information related to the present disclosure and may not constitute prior art.

Vehicle electrical systems include electric machines, e.g., motors and accessory drive devices that receive electric power from energy storage devices and are controlled by signals originating from control modules and other control devices and logic circuits. One electric circuit is a starting system that includes an electric-powered starter motor that includes solenoids that activate the starter motor to spin an internal combustion engine when activated with an ignition switch. A fault in a starter motor solenoid may cause an engine crank fault that results in an engine non-start event.

SUMMARY

An internal combustion engine including a starter is shown. A method for monitoring the starter includes determining electrical energy consumed by pinion and motor solenoids operative to activate and rotate a pinion gear of an electrically-powered motor meshingly engageable to a starter ring gear portion of a flywheel of the engine during an engine starting event. Current ringing in the pinion and motor solenoids is monitored during the engine starting even, and a fault is identified in the pinion and motor solenoids based upon the current ringing and the electrical energy consumption of the starter during the engine starting event.

BRIEF DESCRIPTION OF THE DRAWINGS

One or more embodiments will now be described, by way of example, with reference to the accompanying drawings, in which:

FIGS. 4-1, 4-2 and 4-3 illustrate measured and estimated starter motor solenoids current in relation to time during engine starting events for the starting system and the engine of FIG. 1, in accordance with the disclosure;

FIG. 8-1 illustrates results including electrical energy for a starter employing functional starter solenoids, electrical energy for a starter employing starter solenoids having a fault in the pinion solenoid and electrical energy for a starter employing starter solenoids having a fault in the motor solenoid, in accordance with the disclosure;

FIG. 8-2 illustrates results including an equivalent resistance for a starter employing functional starter solenoids, equivalent resistance for a starter employing starter solenoids having a fault in the pinion solenoid and equivalent resistance for a starter employing starter solenoids having a fault in the motor solenoid, in accordance with the disclosure;

DETAILED DESCRIPTION

Figure 1:
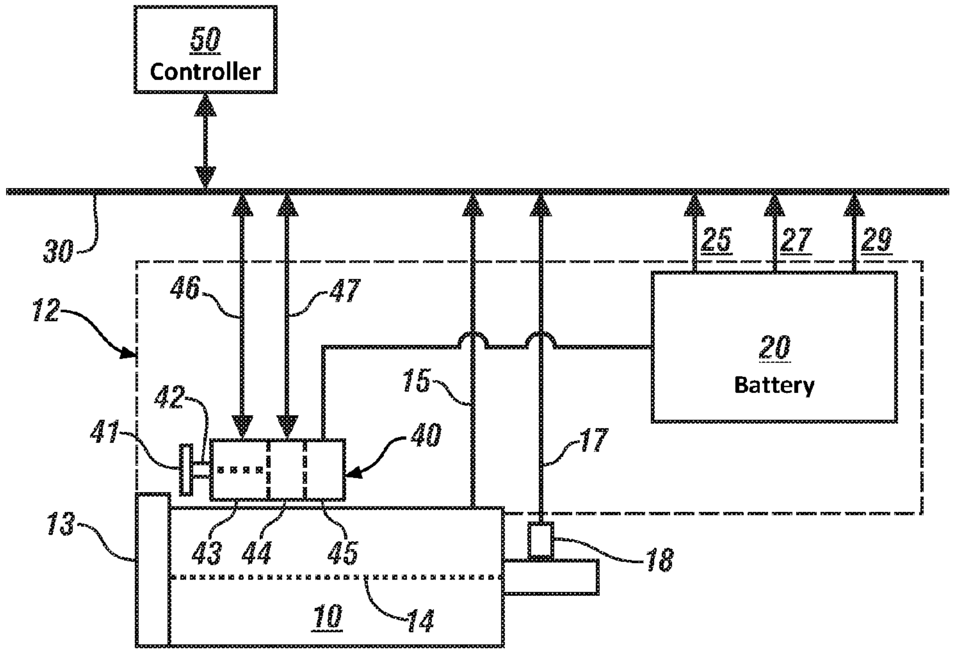
FIG. 1 illustrates an exemplary internal combustion engine including a starting system and a control system, in accordance with the disclosure.

Referring now to the drawings, wherein the showings are for the purpose of illustrating certain exemplary embodiments only and not for the purpose of limiting the same, FIG. 1 schematically shows an internal combustion engine 10 including a starting system 12 and a control system 50. The starting system 12 preferably includes a starter 40 that electrically connects to a battery 20. Internal combustion engine 10 is configured to execute engine stop/start functions including employing the starting system 12 to effect engine autostarting during ongoing powertrain and vehicle operation. The engine 10 and starting system 12 include any internal combustion engine employing a starting system that is configured to execute engine starting events related to engine stop/start functions. Information transfer to and from the control system 50 may be accomplished using one or more communications paths, e.g., communications bus 30, which may include one or more of a direct connection, a local area network bus, and a serial peripheral interface bus.

The engine 10 is equipped with a rotatable crankshaft 14 and flywheel 13, wherein the flywheel 13 includes a starter ring gear portion that is configured to meshingly engage a pinion gear 41 of the starter 40. The engine 10 includes other actuators and sensing devices for monitoring operation and delivering fuel to form a combustion charge to produce torque that is responsive to an operator torque request. In one embodiment, the engine 10 is configured as a spark-ignition engine with combustion controlled by a spark ignition system, and may include operation in a homogeneous charge spark-ignition combustion mode. Alternatively, the engine 10 may be configured as a compression-ignition engine with combustion controlled by timing of injected fuel. Engine actuators preferably include fuel injectors, air flow controllers, spark-ignition systems on engines so equipped, and other devices associated with controlling engine operation to control the aforementioned engine states. Engine sensing devices preferably include a coolant temperature sensor or other device for monitoring engine temperature 15 and a crankshaft position sensor 18 configured to monitor rotational speed 17 of the crankshaft 14 and thus the engine 10.

The battery 20 may be any electrical energy storage device, and in one embodiment is a multi-celled low-voltage lead-acid battery, e.g., a 12V battery. Operating parameters of the battery 20 include battery temperature 25, battery voltage 27 and battery current 29. The battery operating parameters can be directly monitored, estimated, or otherwise determined during ongoing system operation.

The starter 40 preferably includes a permanent-magnet DC electric motor 45 rotatably coupled to a shaft 42 fixedly coupled to the pinion gear 41. The pinion gear 41 is a moveable drive pinion gear that meshingly engages the starter ring gear of the flywheel 13 attached to the crankshaft 14 of the engine 10. The starter 40 preferably includes a tandem solenoids arrangement including a pinion solenoid 43 and a motor solenoid 44 to effect separate and independent controls of the forward sliding of the pinion gear 41 and the energizing of the starter motor 45 to spin the shaft 42. The pinion solenoid 43 and the motor solenoid 44 preferably electrically connect to the battery 20 via a common electric power cable. Thus, the pinion solenoid and the motor solenoid are electrically connected in parallel between the battery and electrical ground and the solenoids equivalent resistance is a Thevenin-equivalent of the resistances of the pinion solenoid 43 and the motor solenoid 44. A motor solenoid control signal 47 activates the motor solenoid 44 to cause the shaft 42 to spin, with rotational speed and torque determined based upon characteristics of the motor solenoid control signal 47. A pinion solenoid control signal 46 activates the pinion solenoid 43 to cause the moveable drive pinion gear 41 to slide forward to meshingly engage the starter ring gear of the flywheel 13, thus spinning the engine 10. Such a configuration permits an engine starting sequence that includes activating the starter motor 45 to spin the shaft 42 to synchronize speeds with the engine 10 and activating the moveable drive pinion gear to meshingly engage the starter ring gear of the flywheel 13 when the speeds are synchronized, thus permitting engine starting when the engine speed is non-zero.

The controller 50 initiates an engine starting event by communicating an engine start signal to activate the starter switch that is configured to electrically connect the starter motor 16 to the battery 20. An engine starting event can be initiated in response to an operator key-on command or in response to an engine autostart command that is a part of the engine stop/start function. The control system 50 is configured to control operation of the engine 10 during each starting event. An engine starting event includes activating the starter 40 while coincidentally controlling engine fueling and spark on spark-ignition engines. Each starting event preferably includes a command to start the engine 10 wherein the starter switch is activated to electrically connect the starter motor 16 to the battery 20 and activating the motor solenoid 44 to cause the starter motor 45 to spin with corresponding activation of the pinion activation solenoid 43 to urge the shaft 42 and pinion gear 41 into engagement with the starter ring gear portion of the flywheel 13. The control system 50 coincidentally controls engine fueling and spark on spark-ignition engines to start the engine 10 by executing other engine control functions related to fueling and firing the engine 10.

The controller 50 executes the engine stop/start function to automatically stop (autostop) and automatically restart (autostart) engine operation during ongoing vehicle operation in response to operator commands and on-vehicle demands. By way of example, an autostop command may be executed to achieve an engine OFF state when a vehicle is in a stopped condition, such as when waiting at a traffic light. An autostart engine starting event is executed in response to a command from the control system 50 to activate the starter switch, for example subsequent to an autostop command during ongoing vehicle operation. The engine can execute a starting event to operate in an engine ON state in response to an autostart command caused by an operator action such as depressing an accelerator pedal. The stop/start function may provide benefits of improved fuel efficiency and/or reduced emissions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

The engine speed may be at 0 RPM, i.e., in an OFF state and not rotating prior to initiating a starting event. Alternatively, the engine may be spinning at a low speed in an unfueled condition prior to initiating the starting event. This can include vehicle operation wherein the vehicle is presently moving during the starting event. A key-on engine starting event is executed in response to an operator key-on command to the starter switch, for example when an operator first enters a vehicle to begin a trip. It is appreciated that a key-on engine starting event includes operator-initiated remote-start events and other similar operations.

A routine for monitoring state-of-health (SOH) of the starter solenoids includes determining magnitude of electrical energy consumed by the starter solenoids during each engine starting event. Solenoid faults include performance and functional degradation due to overheating of solenoid coils, and solenoid electrical shorts. This includes determining an equivalent resistance of the starter solenoids to monitor the solenoid energy consumption during the time the solenoids are active until the engine 10 fires and starts. Solenoids energy consumption decreases when there is an increase in the solenoids equivalent resistance and increases when an electrical short occurs in the solenoids. In both cases the solenoids active time will increase. By monitoring the change in the energy, solenoids equivalent resistance and starter active time, the state of health (SOH) of the solenoids can be inferred from the changes of these parameters. Fault monitoring includes isolating to a fault in either the pinion solenoid or the motor solenoid.

Figure 2:
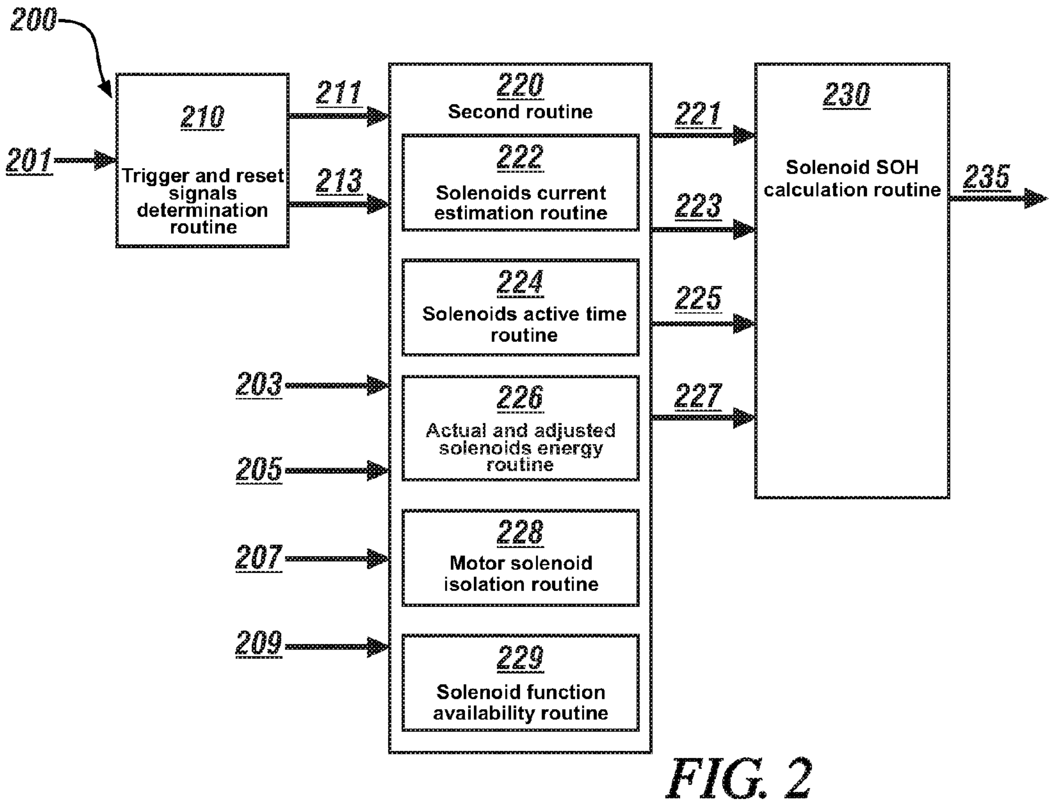
FIG. 2 illustrates a starter motor solenoid state-of-health (SOH) monitoring routine configured to evaluate starter motor solenoids of an internal combustion engine, in accordance with the disclosure.

FIG. 2 schematically shows a starter motor solenoids state-of-health (SOH) monitoring routine (monitoring routine) 200 configured to evaluate solenoids for a starter motor of an internal combustion engine. SOH is an indicator of remaining useful life of a device or system, preferably expressed as a percentage of total life of the device or system. A starter motor solenoids SOH is an indicator of SOH of the starter motor solenoids. The monitoring routine 200 determines solenoid energy consumption and time the solenoids are active until engine starts during a starting event based upon monitored parameters, and determines a starter motor solenoids SOH based on such energy consumption and time, taking into account other factors related to engine, vehicle, and ambient conditions. The starter motor solenoids SOH can be employed to decide whether to permit subsequent engine stop/start events during ongoing vehicle operation.

Preferred operating parameters for the starting system that are monitored during each starting event include a crank signal 201, battery voltage ($V_{bat}$) 203, battery current ($I_{bat}$) 205, engine speed ($N_{eng}$) 207, and a starter motor temperature ($T_{SM}$) 209. The operating parameters can be directly monitored using on-board sensors, inferred from information obtained from other sensors, estimated or otherwise determined using models reduced to routines implemented in a controller.

The monitoring routine 200 initiates when the crank signal 201 indicates engine cranking is active, i.e., an engine starting event is occurring. Initiating the monitoring routine 200 includes determining trigger and reset signals (210) in response to the crank signal 201 to re-initialize parameters each time the engine starts during an engine stop/start event. This includes setting a trigger signal Ts 211 to T(t)=1 in response to the crank signal 201 and setting a reset signal R 213 to R=max [0, (T(t)−T(t−1))], wherein (t) indicates a presently occurring starting event and (t−1) indicates a previous starting event.

The trigger signal Ts 211 and reset signal R 213 are employed to initiate monitoring and tracking states of the battery voltage 203, battery current 205, engine speed 207 and starter motor temperature 209, which are employed in a second routine 220 that includes a solenoids current estimation routine 222, a solenoids active time routine 224, a routine to determine actual and adjusted solenoids energy 226, a motor solenoid isolation routine 228 and a routine to calculate solenoid function availability 229. A third routine 230 calculates a solenoid SOH 235 based upon the outputs from the second routine 220.

Figure 3:
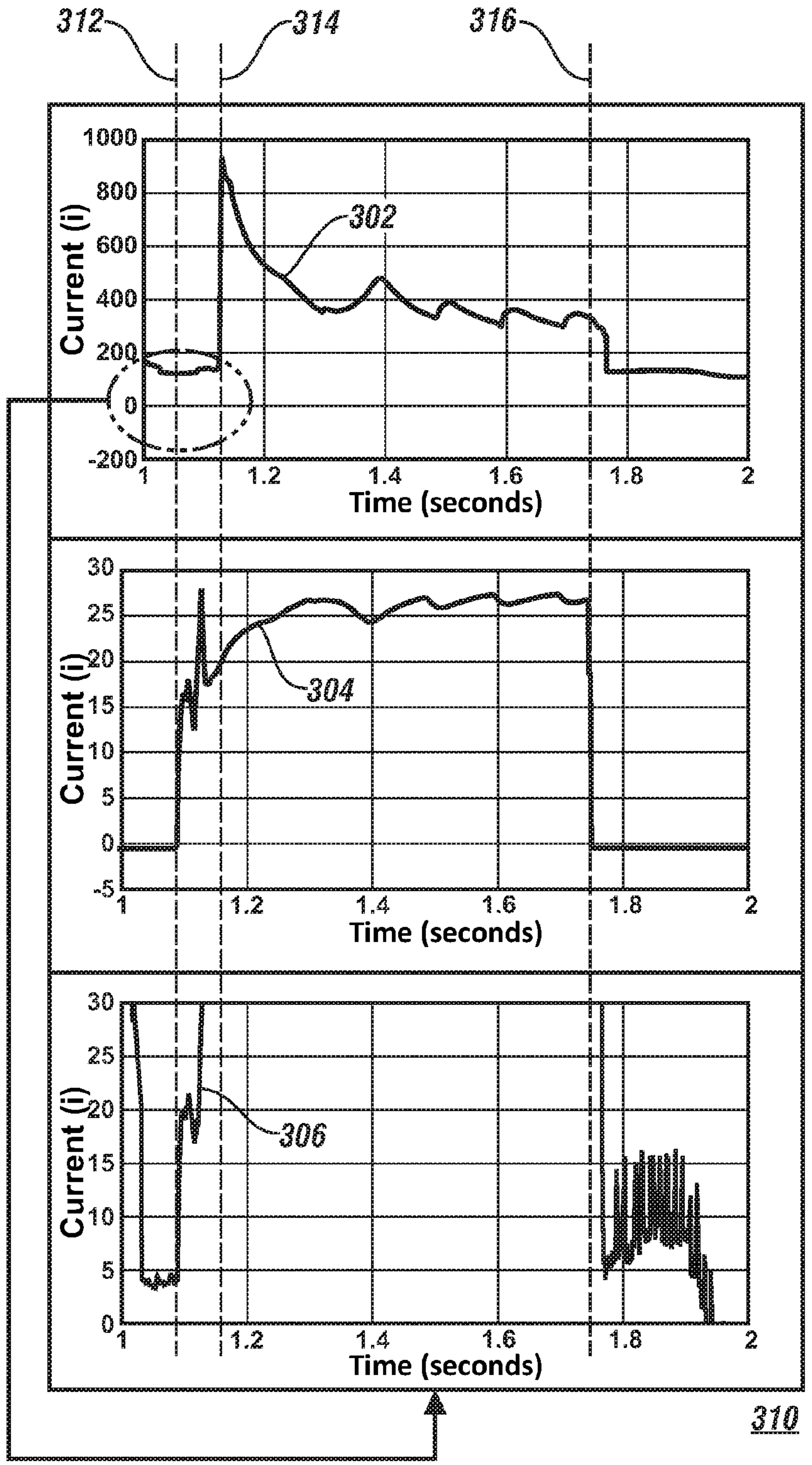
FIG. 3 illustrates states of monitored and estimated starter motor parameters prior to and during a starting event, including battery current, starter solenoids current and battery current in relation to time, in accordance with the disclosure.

FIG. 3 graphically shows states of monitored and estimated starter motor parameters prior to and during a starting event, including battery current 302, starter solenoids current 304 and battery current 306 in relation to time 310, wherein battery current 306 depicts the same data as battery current 302 using an expanded, i.e., zoomed-in current scale to depict a profile of the solenoids current. A solenoids equivalent resistance can be estimated between time points 312 and 314 during activation of the motor solenoid and prior to activation of the pinion solenoid. When using only the battery current measurement, the duration when the battery current 306 is equal to the solenoids current 304 before the pinion gear engages the ring gear is very short, occurring between time points 312 and 314. At time point 314, the starter motor current 302 is several orders of magnitude greater than the solenoids current 304. The solenoids equivalent resistance is estimated in the interval between time points 312 and 314, and the battery voltage and the equivalent resistance are employed to estimate the solenoids current in the interval between time points 314 and 316 using known relationships between voltage, current and the solenoids equivalent resistance. The starter activation ends at time point 316.

Figures 1, 4:
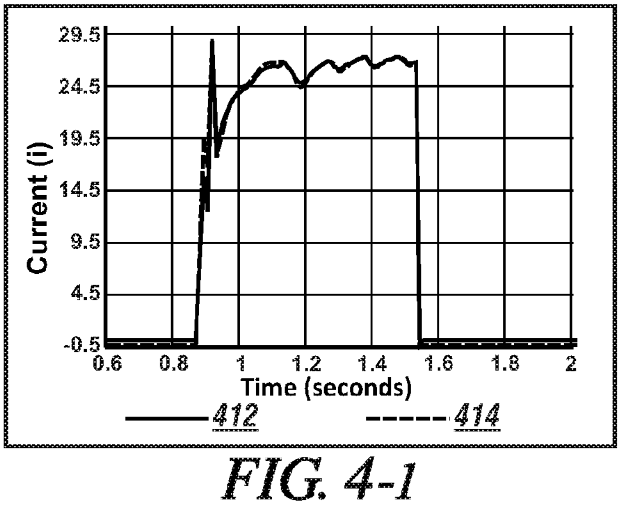
Figures 2, 4:
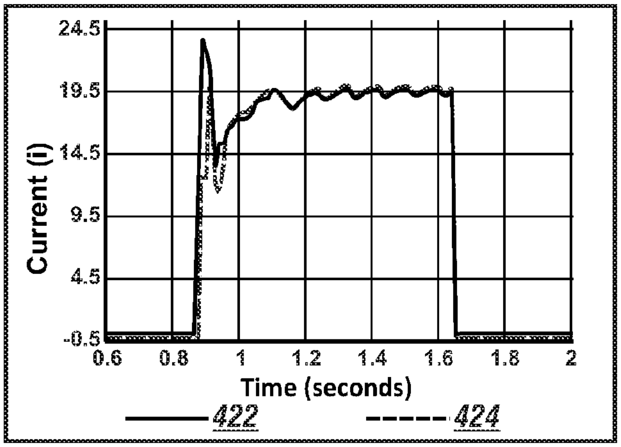
Figures 3, 4:
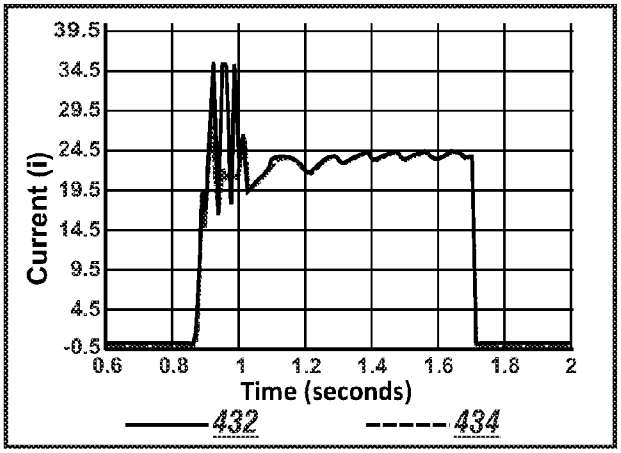

FIGS. 4-1, 4-2 and 4-3 graphically show measured and estimated starter motor solenoids current in relation to time during engine starting events for starting system 12 and the engine 10 described with reference to FIG. 1. FIG. 4-1 depicts measured and estimated starter motor solenoids current 412 and 414, respectively, for starting system 12 operating in accordance with manufacturer's specifications under nominal ambient conditions. FIG. 4-2 depicts measured and estimated starter motor solenoids current 422 and 424, respectively, for starting system 12 operating with a pinion solenoid fault under nominal ambient conditions. As shown, the pinion solenoid fault causes a substantial reduction in magnitude of electrical current draw during engine starting. FIG. 4-3 depicts measured and estimated starter motor solenoids current 432 and 434, respectively, for starting system 12 operating with a motor solenoid fault under nominal ambient conditions. As shown, the motor solenoid fault causes substantial ringing in the electrical current during the early portion of engine starting. These characteristics can be related to solenoid energy consumption and employed to detect and isolate a fault in the starter motor solenoids.

Figure 5:
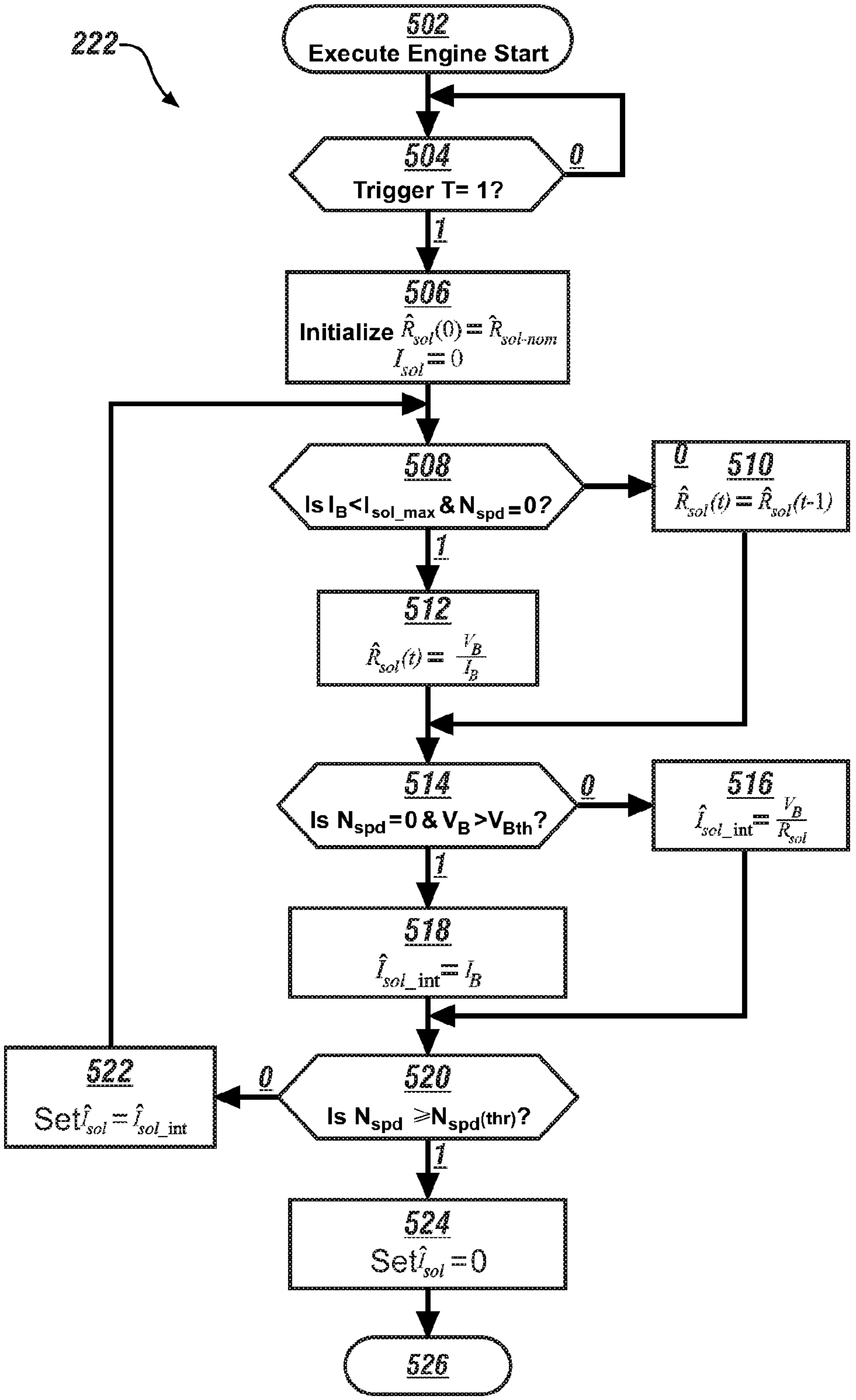
FIG. 5 illustrates the starter solenoids current estimation routine in flowchart form for evaluating a starter motor solenoid for an internal combustion engine, in accordance with the disclosure.

FIG. 5 schematically depicts the solenoids current estimation routine 222 in flowchart form for evaluating a starter motor for an internal combustion engine, e.g., the starting system 12 and the engine 10 of FIG. 1. The solenoid current estimation routine 222 is preferably executed in the control module 50 as one or more routines and associated calibrations to estimate the equivalent resistance of a pinion activation solenoid and a motor solenoid for the starter motor. Table 1 is provided as a key to FIG. 5 wherein the numerically labeled blocks and the corresponding functions are set forth as follows.

TABLE 1

FIG. 5

| BLOCK | BLOCK CONTENTS |
|---|---|
| 502 | Execute Engine Start |
| 504 | Trigger T = 1? |
| 506 | Initialize<br>$\hat{R}_{sol}(0) = \hat{R}_{sol\_nom}$<br>$I_{sol} = 0$ |
| 508 | Is $I_B < I_{sol\_max}$ & $N_{spd} = 0$? |
| 510 | $\hat{R}_{sol}(t) = \hat{R}_{sol}(t-1)$ |
| 512 | $\hat{R}_{sol}(t) = \frac{V_B}{I_B}$ |
| 514 | Is $N_{spd} = 0$ & $V_B > V_{Bth}$? |
| 516 | $\hat{I}_{sol\_int} = \frac{V_B}{\hat{R}_{sol}}$ |
| 518 | $\hat{I}_{sol\_int} = IB$ |

TABLE 1-continued

| FIG. 5 | |
|---|---|
| BLOCK | BLOCK CONTENTS |
| 520 | Is $N_{spd} \geq N_{spd(thr)}$? |
| 522 | Set $\hat{I}_{sol} = \hat{I}_{sol\_int}$ |
| 524 | Set $\hat{I}_{sol} = 0$ |
| 526 | End |

The solenoids current estimation process 500 executes (502) by monitoring the trigger signal Ts 211 (504), initiates operation when the trigger signal Ts 211 is set (T=1) (504)(1). An estimated solenoids resistance is initially set equal to a nominal solenoids resistance ($\hat{R}_{sol}(0)=\hat{R}_{sol\_nom}$) with an estimated solenoids current ($I_{sol}$) set equal to zero (506).

Battery current $I_B$ and starter motor speed $N_{spd}$ are monitored (508). When the battery current $I_B$ is less than a maximum threshold for solenoids current ($I_B<I_{sol\_max}$) and starter motor speed $N_{spd}$ is equal to zero ($N_{spd}=0$) (508)(1), the estimated solenoids resistance $\hat{R}_{sol}(t)$ is calculated as a ratio of battery voltage $V_B$ and battery current $I_B$ (512) and operation continues. When the battery current $I_B$ is not less than a maximum threshold for solenoids current ($I_B<I_{sol\_max}$) or starter motor speed $N_{spd}$ is not equal to zero ($N_{spd}=0$) (508)(0), the estimated solenoids resistance is set equal to the estimated solenoids resistance from a previous iteration ($\hat{R}_{sol}(t)=\hat{R}_{sol}(t-1)$) (510). This portion of the solenoids current estimation process 500 thus determines the estimated solenoids resistance $\hat{R}_{sol}(t)$, which corresponds to the solenoids equivalent resistance that is described and determined with reference to FIG. 3 as estimated between time points 312 and 314. The solenoids resistance is thus determined by monitoring battery voltage and current flow through the pinion and motor solenoids during activation of the motor solenoid prior to activation of the pinion solenoid.

Operation of the solenoids current estimation process 500 continues with continued monitoring of the starter motor speed $N_{spd}$ and battery voltage $V_B$ in order to determine the battery current (514). When the starter motor speed $N_{spd}$ remains zero and the battery voltage $V_B$ is greater than a threshold voltage (514)(1), an interim solenoids current is set equal to the present battery current ($\hat{I}_{sol\_int}=I_B$) (518). When the starter motor speed $N_{spd}$ does not remain zero or the battery voltage $V_B$ is greater than a threshold voltage (514)(0), the estimated solenoids current is calculated based upon a ratio of the battery voltage $V_B$ and the estimated solenoids resistance $\hat{R}_{sol}(t)$ (516). The starter motor speed $N_{spd}$ is compared to a threshold speed $N_{spd(thr)}$ (520) to determine whether the engine has started running and execution of this routine 500 continues by setting the estimated solenoids current equal to the interim battery current $\hat{I}_{sol}=I_{sol}$ (522) when the starter motor speed $N_{spd}$ is less than the threshold speed $N_{spd(thr)}$ (520)(0). When the starter motor speed $N_{spd}$ is not less than the threshold speed $N_{spd(thr)}$ (520)(1), indicating the engine is running, the estimated solenoids current $\hat{I}_{sol}$ is captured for use in the routine to determine actual and temperature-adjusted solenoids energy 226 and the estimated solenoids current term $\hat{I}_{sol}$ is reset to zero (524) and this iteration of the routine 500 ends (526). In this manner, the estimated solenoids current can be calculated based upon a ratio of the battery voltage and the estimated solenoids resistance during an engine starting event.

Figure 6:
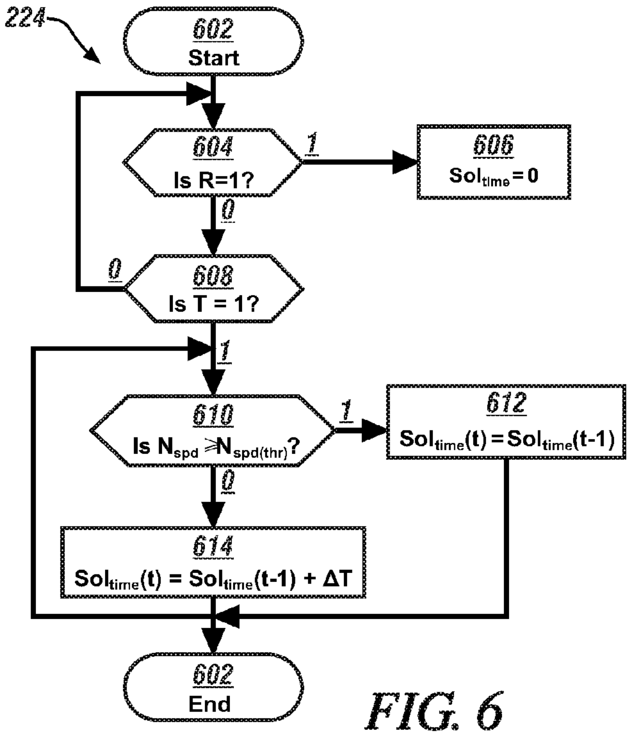
FIG. 6 schematically depicts a routine for determining a time period over which starter solenoids are active during an engine starting event, in accordance with the disclosure.

FIG. 6 schematically depicts the solenoids active time routine 224 in flowchart form for determining a time period over which the starter solenoids are active during an engine starting event. The solenoids active time routine 224 is preferably executed in the control module 50 as one or more routines and associated calibrations to determine the time period over which one or both the pinion activation solenoid and motor solenoid for the starter motor are active. Table 2 is provided as a key to FIG. 6 wherein the numerically labeled blocks and the corresponding functions are set forth as follows.

TABLE 2

| FIG. 6 | |
|---|---|
| BLOCK | BLOCK CONTENTS |
| 602 | Start |
| 604 | Is R = 1? |
| 606 | $Sol_{time} = 0$ |
| 608 | Is T = 1? |
| 610 | Is $N_{spd} \geq N_{spd(thr)}$? |
| 612 | $Sol_{time}$ (t) = $Sol_{time}$ (t−1) |
| 614 | $Sol_{time}$ (t) = $Sol_{time}$ (t−1) + ΔT |
| 616 | End |

Each iteration (602) the reset signal R 213 is monitored (604) and the trigger signal Ts 211 is monitored (608). When the reset signal R 213 is activated, i.e., set equal to one (604)(1), the solenoids active time $Sol_{time}$ is reset to 0 (606). When the reset signal R 213 is not activated, i.e., not set equal to one (604)(0) the trigger signal Ts 211 is monitored to determine when activated, i.e., set equal to one (608)(1). When the trigger signal Ts 211 is not activated (608)(0), there is no further action and the routine continues to monitor the reset signal R (604). When the trigger signal Ts 211 is activated (608)(1), the solenoids speed is monitored to determine whether it is greater than a threshold speed (Is $N_{spd}\geq N_{spd(thr)}$?) (610), indicating whether the engine has started. When the solenoid speed is greater than or equal to the threshold speed (610)(1), the solenoids active time for the present iteration is set equal to the solenoids active time for the previous iteration ($Sol_{time}(t)=Sol_{time}(t-1)$) (612) and this iteration of the routine 224 ends (616). When the solenoid speed is less than the threshold speed (610)(0), the solenoids active time for the present iteration is increased by a time period ΔT ($Sol_{time}(t)=Sol_{time}(t-1)+\Delta T$) (614) and this iteration of the routine 224 ends (616). In this manner the solenoids active time is determined as either a time period associated with achieving the threshold solenoid speed or a minimum time period.

Figure 7:
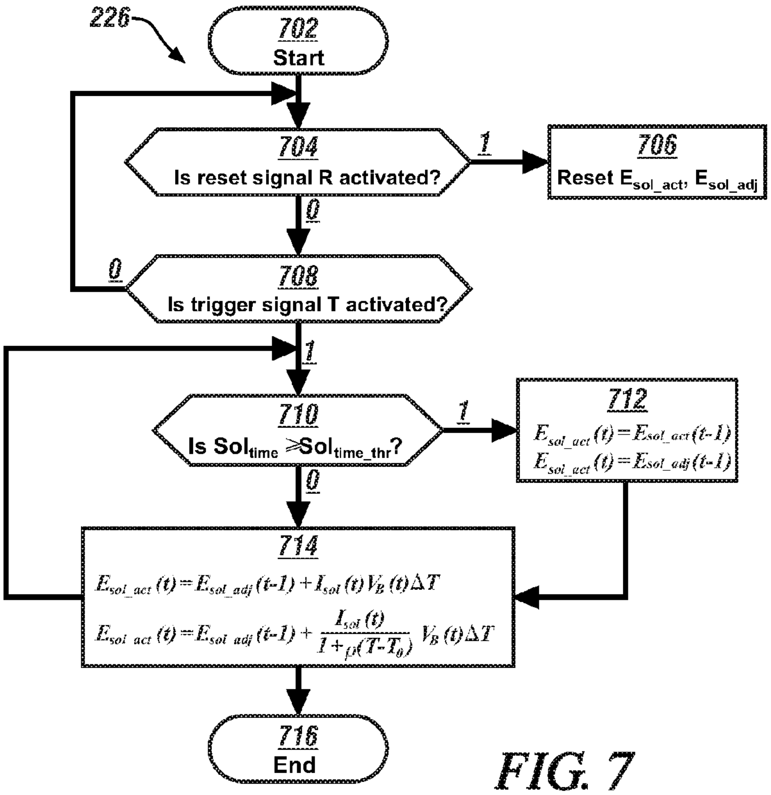
FIG. 7 illustrates a routine to determine actual and adjusted solenoid energy for determining solenoids energy when the starter solenoids are active during an engine starting event, in accordance with the disclosure.

FIG. 7 schematically depicts the routine to determine actual and temperature-adjusted solenoids energy 226 in flowchart form for determining solenoids energy when the starter solenoids are active during an engine starting event. The routine to determine actual and temperature-adjusted solenoids energy 226 is preferably executed in the control module 50 as one or more routines and associated calibrations to estimate the energy consumed by activation of the pinion activation solenoid and the motor solenoid for the starter motor. Table 3 is provided as a key to FIG. 7 wherein the numerically labeled blocks and the corresponding functions are set forth as follows.

TABLE 3

| FIG. 7 | |
|---|---|
| BLOCK | BLOCK CONTENTS |
| 702 | Start |
| 704 | Is reset signal R activated? |
| 706 | Reset $E_{sol\_act}$, $E_{sol\_adj}$ |
| 708 | Is trigger signal T activated? |
| 710 | Is $Sol_{time} \geq Sol_{time\_thr}$? |
| 712 | $E_{sol\_act}(t) = E_{sol\_act}(t-1)$<br>$E_{sol\_adj}(t) = E_{sol\_adj}(t-1)$ |

TABLE 3-continued

| FIG. 7 | |
|---|---|
| BLOCK | BLOCK CONTENTS |
| 714 | $E_{sol\_act}(t) = E_{sol\_act}(t-1) + I_{sol}(t)V_B(t)\Delta T$ <br> $E_{sol\_adj}(t) = E_{sol\_adj}(t-1) + \frac{I_{sol}(t)}{1+\rho(T-T_0)}V_B(t)\Delta T$ |
| 716 | End |

Each iteration (702), the reset signal R 213 is monitored (704) and the trigger signal Ts 211 is monitored (708). When the reset signal R 213 is activated, i.e., set equal to one (704)(1), the actual solenoids energy $E_{sol\_act}$ and temperature-adjusted solenoids energy $E_{sol\_adj}$ are reset to 0 (706). When the reset signal R 213 is not activated, i.e., not set equal to one (704)(0) the trigger signal Ts 211 is monitored to determine when activated, i.e., set equal to one (708)(1). When the trigger signal Ts 211 is not activated (708)(0), there is no further action and the routine continues to monitor the reset signal R (704). When the trigger signal Ts 211 is activated (708)(1), the solenoids active time $Sol_{time}$ is compared to a threshold solenoids active time $Sol_{time\_thr}$ (710). During the period of time during which the solenoids are active (710)(0), the actual solenoids energy $E_{sol\_act}$ and temperature-adjusted solenoids energy $E_{sol\_adj}$ are integrated (714) in accordance with the following relationship:

$$E_{sol\_act}(t) = E_{sol\_act}(t-1) + I_{sol}(t)V_B(t)\Delta T \quad [1]$$

$$E_{sol\_adj}(t) = E_{sol\_adj}(t-1) + \frac{I_{sol}(t)}{1+\rho(T-T_0)}V_B(t)\Delta T \quad [2]$$

wherein $I_{sol}$ indicates solenoids current;

$V_B$ indicates battery voltage;

(t) indicates a present iteration;

(t−1) indicates a previous iteration; and

ΔT is elapsed time.

The solenoids current $I_{sol}$ is estimated using the equivalent resistance and solenoids current estimation routine 222 described with reference to FIG. 5.

The solenoids resistance is temperature-dependent in accordance with the following relationship:

$$R_{sol\_adj\_nom}(T)=R_{sol\_nom}(1+\rho(T-T_0)) \quad [3]$$

wherein $R_{sol\_adj\_nom}$ is a temperature-adjusted nominal resistance;

$R_{sol\_nom}$ is a nominal resistance;

$T_0$ is the nominal temperature at which resistance is measured;

T is the present temperature of the solenoid; and

ρ is the thermal coefficient of resistivity for wire material, which is 0.00393/° C. for copper wire.

When the solenoids is inactive (710)(1), the actual solenoids energy $E_{sol\_act}$ and temperature-adjusted solenoids energy $E_{sol\_adj}$ are carried over from the previous iteration (712) in accordance with the following relationships:

$$E_{sol\_act}(t)=E_{sol\_act}(t-1) \quad [4]$$

$$E_{sol\_adj}(t)=E_{sol\_adj}(t-1) \quad [5]$$

Figures 1, 8:
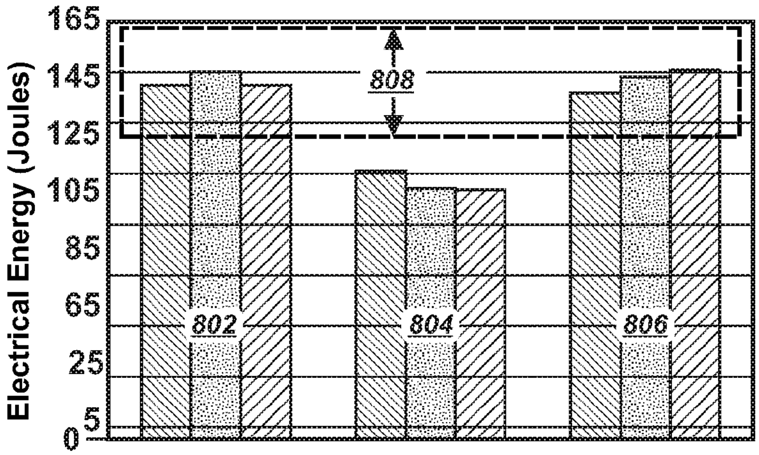
Figures 2, 8:
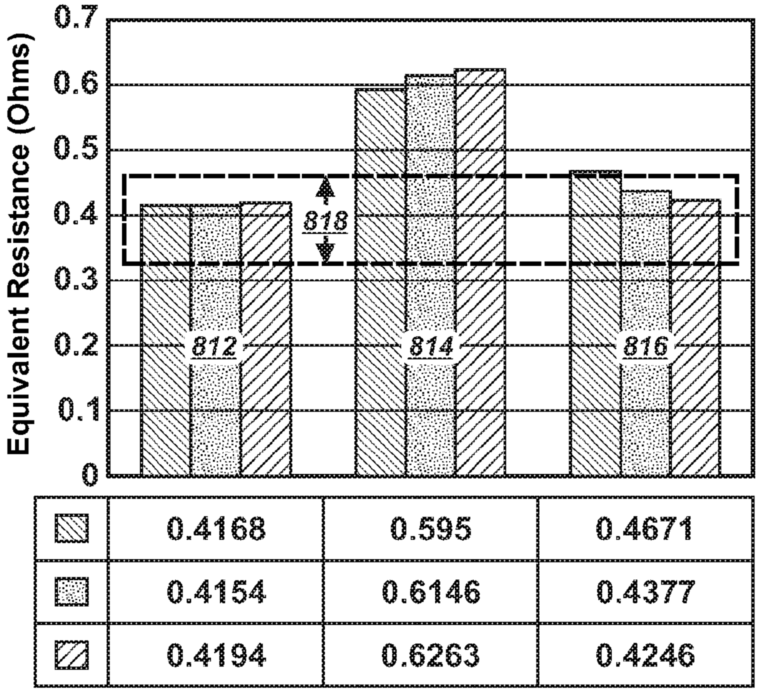

Thus, the solenoids energy and resistance can be determined and employed to evaluate the starter SOH as described herein, including with reference to FIGS. 8-1 and 8-2.

FIG. 8-1 graphically illustrates results including electrical energy (Joules) for a starter employing functional starter solenoids 802, electrical energy (Joules) for a starter employing starter solenoids having a fault in the pinion solenoid 804 and electrical energy (Joules) for a starter employing starter solenoids having a fault in the motor solenoid 806. An operating band 808 associated with a range of allowable electrical energy (Joules) is also shown. FIG. 8-2 graphically illustrates results including an equivalent resistance (Ohms) for a starter employing functional starter solenoids 812, equivalent resistance (Ohms) for a starter employing starter solenoids having a fault in the pinion solenoid 814 and equivalent resistance (Ohms) for a starter employing starter solenoids having a fault in the motor solenoid 816. An operating band 818 associated with a range of allowable equivalent resistance (Ohms) is also shown. The results indicate that in the case of a pinion solenoid fault, both solenoids energy and resistance fall outside the operating bands 808 and 818, respectively. The results indicate that in the case of a motor solenoid fault, both solenoids energy and resistance could fall within the operating bands 808 and 818, respectively. Thus, additional information is needed to detect and isolate presence of a motor solenoid fault.

Figure 9:
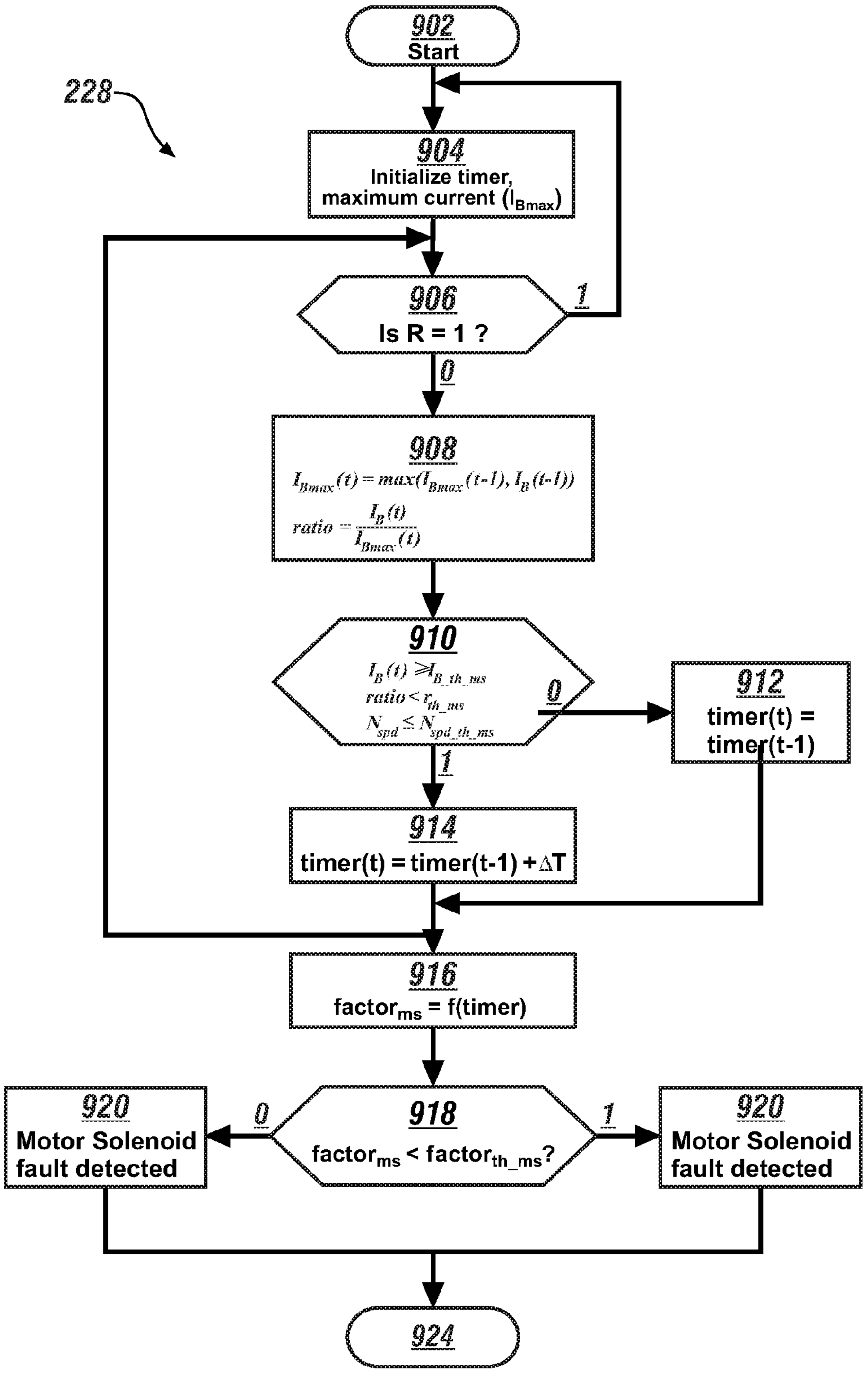
FIG. 9 illustrates a motor solenoid isolation routine for isolating a fault in the motor solenoid, in accordance with the disclosure.

FIG. 9 schematically depicts the motor solenoid isolation routine 228 in flowchart form for isolating a fault in the motor solenoid. The motor solenoid isolation routine 228 is preferably executed in the control module 50 as one or more routines and associated calibrations. As shown with reference to FIG. 4-3, a motor solenoid fault causes ringing in the solenoids current during the initial operation of the starter. Thus the motor solenoid isolation routine 228 operates to measure current ringing during a starting event in terms of a quantity of current oscillations and a magnitude of the current oscillations. Table 4 is provided as a key to FIG. 9 wherein the numerically labeled blocks and the corresponding functions are set forth as follows.

TABLE 4

| FIG. 9 | |
|---|---|
| BLOCK | BLOCK CONTENTS |
| 902 | Start |
| 904 | Initialize timer, maximum current ($I_{Bmax}$) |
| 906 | Is R = 1? |
| 908 | $I_{Bmax}(t) = \max(I_{Bmax}(t-1), I_B(t-1))$ <br> $\text{ratio} = \frac{I_B(t)}{I_{Bmax}(t)}$ |
| 910 | Is $I_B(t) \geq I_{B\_th\_ms}$ <br> and is <br> ratio < $r_{th\_ms}$ or <br> $N_{spd} \leq N_{spd\_th\_ms}$? |
| 912 | timer(t) = timer(t − 1) |
| 914 | timer(t) = timer(t − 1) + ΔT |
| 916 | $factor_{ms}$ = f(timer) |
| 918 | $factor_{ms} < factor_{th\_ms}$? |
| 920 | Motor Solenoid fault detected |
| 922 | No fault detected |
| 924 | End |

Each iteration (902), a timer and maximum current ($I_{Bmax}$) are initialized to zero (904) and the reset signal R is monitored (906). This loop continues to execute while the reset signal R is activated, i.e., set equal to one (906)(1). When the reset signal R is deactivated, i.e., set equal to zero (906)(0), the maximum current $I_{Bmax}$ is determined as a maximum of the peak current from a previous cycle $I_{Bmax}$ (t−1) and the current from the previous cycle $I_B(t-1)$ (908) in accordance with the following relationship.

$$I_{Bmax}(t)=\max(I_{Bmax}(t-1),I_B(t-1)) \qquad [6]$$

A ratio of the current $I_B(t)$ and the peak current $I_{Bmax}(t)$ for the present cycle t is also determined in accordance with the following relationship.

$$\text{ratio} = \frac{I_B(t)}{I_{Bmax}(t)} \qquad [7]$$

The current $I_B(t)$ for the present cycle is compared to a motor solenoid threshold current $I_{B\_th\_ms}$, and the ratio is compared to a motor solenoid threshold ratio $r_{th\_ms}$ (910). When the current $I_B(t)$ for the present cycle is greater than or equal to the motor solenoid threshold current $I_{B\_th\_ms}$, and the ratio is less than the motor solenoid threshold ratio $r_{th\_ms}$ or the starter motor speed $N_{spd}$ is equal to or less than $N_{spd\_th\_ms}$ (910)(1), a timer is incremented (914). When the current $I_B(t)$ for the present cycle is not greater than or equal to the motor solenoid threshold current $I_{B\_th\_ms}$, or the ratio is not less than the motor solenoid threshold ratio $r_{th\_ms}$ and the starter motor speed $N_{spd}$ is not equal to or less than $N_{spd\_th\_ms}$ (910)(0), the timer remains unchanged for this iteration (912).

Figure 10:
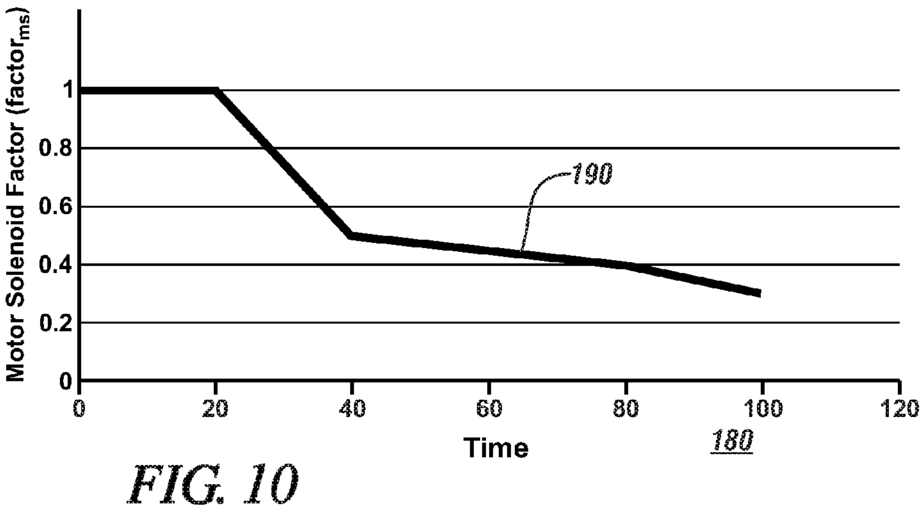
FIG. 10 illustrates a calibration for a motor solenoid factor plotted in relation to time, in accordance with the disclosure.

A motor solenoid factor ($factor_{ms}$) is selected from a predetermined calibration based upon the magnitude of the timer (916). FIG. 10 graphically shows an exemplary calibration curve including the motor solenoid factor ($factor_{ms}$) on the vertical y-axis in relation to the magnitude of the timer on the horizontal x-axis. The motor solenoid factor is compared to a threshold motor solenoid factor (918), and when the motor solenoid factor is less than the threshold motor solenoid factor (918)(1), a fault in the motor solenoid is detected (920) and this iteration of the routine ends (924). When the motor solenoid factor is greater than or equal to the threshold motor solenoid factor (918)(0), no fault in the motor solenoid is detected (922) and this iteration of the routine ends (924). The motor solenoid isolation routine 228 thus operates to measure current ringing during a starting event in terms of a quantity of current oscillations and a magnitude of the current oscillations.

FIG. 10 graphically illustrates a calibration for the motor solenoid factor ($factor_{ms}$) 190 on the vertical y-axis plotted in relation to time 180 on the horizontal x-axis. The motor solenoid factor 190 ranges from a maximum value of 1.0 that corresponds to a low amount of time to a minimum value that approaches 0.0 with increasing time. The time 180 is associated with a period of time during which the battery current is oscillating, i.e., ringing during engine starting, and provides an indication of existence of a fault in the motor solenoid.

Figure 11:
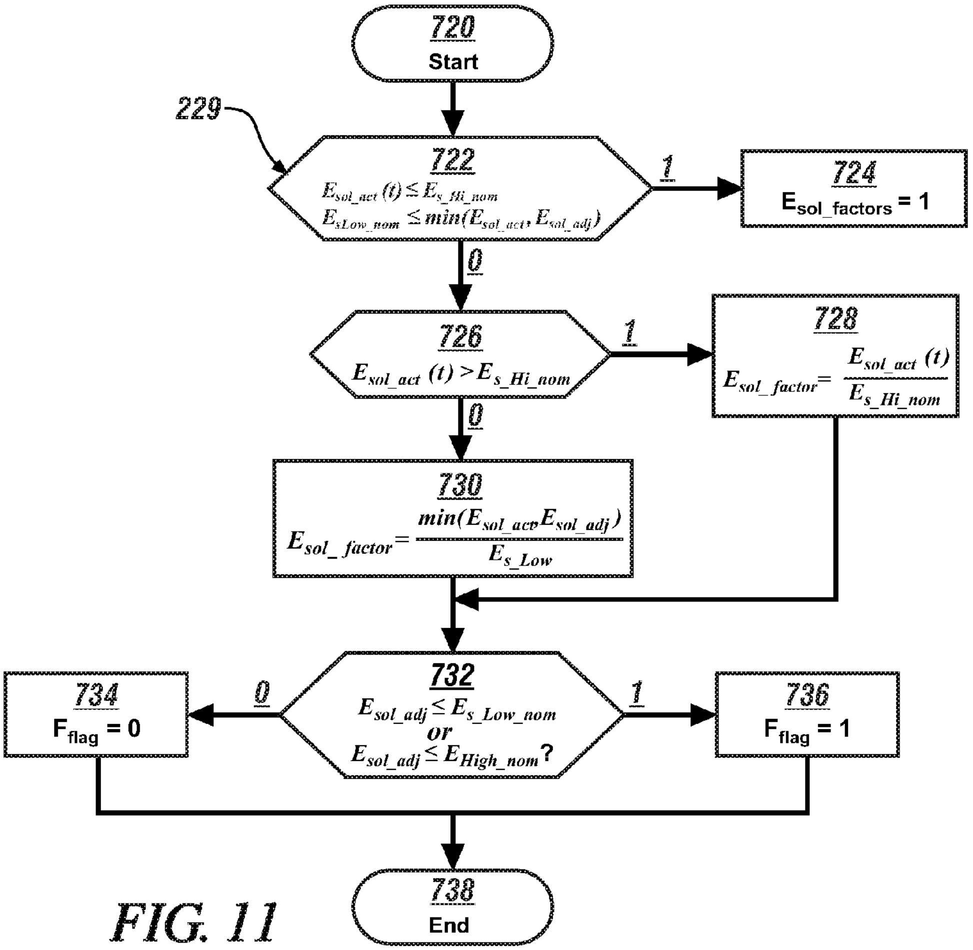
FIG. 11 illustrates a routine to calculate solenoid function availability for evaluating solenoids energy, in accordance with the disclosure.

FIG. 11 schematically depicts the routine to determine solenoid function availability 229 by evaluating the solenoids energy. The routine to evaluate the solenoids energy is preferably executed in the control module 50 as one or more routines and associated calibrations. Table 5 is provided as a key to FIG. 11 wherein the numerically labeled blocks and the corresponding functions are set forth as follows.

TABLE 5

FIG. 11

| BLOCK | BLOCK CONTENTS |
|---|---|
| 720 | Start |
| 722 | Is $E_{sol\_act}(t) \le E_{s\_Hi\_nom}$ & $E_{s\_Low\_nom} \le \min(E_{sol\_act}, E_{sol\_adj})$ |
| 724 | $E_{sol\_factor} = 1$ |
| 726 | $E_{sol\_act}(t) > E_{s\_Hi\_nom}$ |
| 728 | $E_{sol\_factor} = \frac{E_{sol\_act}(t)}{E_{s\_Hi\_nom}}$ |
| 730 | $E_{sol\_factor} = \frac{\min(E_{sol\_act}, E_{sol\_adj})}{E_{s\_Low}}$ |
| 732 | Is $E_{sol\_adj} \le E_{s\_Low\_nom}$ or $E_{sol\_adj} \le E_{s\_High\_nom}$ ? |
| 734 | $F_{flag} = 0$ |
| 736 | $F_{flag} = 1$ |
| 738 | End |

Upon initiating the routine 720, the actual solenoid energy ($E_{sol\_act}(t)$) is evaluated to determine whether the actual solenoids energy is within an energy band defined by a high nominal solenoids energy ($E_{s\_Hi\_nom}$) and a low nominal solenoids energy ($E_{s\_Low\_nom}$) (722), with the energy band determined for a starter system operating in accordance with manufacturer's specifications. When the solenoids energy is within the energy band (722)(1), an energy solenoids factor ($E_{sol\_factor}$) is set equal to 1 (724) and this iteration ends.

When the solenoids energy is outside the energy band (722)(0), the solenoids energy factor is compared with the high nominal solenoids energy (726) and when it is greater than the high nominal solenoids energy (726)(1), the solenoids energy factor is calculated as a ratio of the actual solenoid energy and the high nominal solenoids energy (728). When it is less than the high nominal solenoids energy (726)(0), the solenoids energy factor is calculated as a ratio of a minimum of the actual solenoids energy and the temperature-adjusted solenoids energy, and the low nominal solenoids energy (730).

The temperature-adjusted solenoids energy for this iteration ($E_{sol\_adj}(t)$) is evaluated to determine whether it is within the energy band defined by the high nominal solenoids energy and the low nominal solenoids energy (732). When the temperature-adjusted solenoids energy is greater than or equal to the high nominal solenoids energy or is less than or equal to the low nominal solenoids energy (732)(1), the fault flag is set equal to 1 ($F_{flag}$=1) (736) and this iteration ends (738). When the temperature-adjusted solenoids energy is not greater than or equal to the high nominal solenoids energy and is not less than or equal to the low nominal solenoids energy (732)(0), the fault flag is set equal to 0 ($F_{flag}$=0) (734) and this iteration ends (738).

Figure 12:
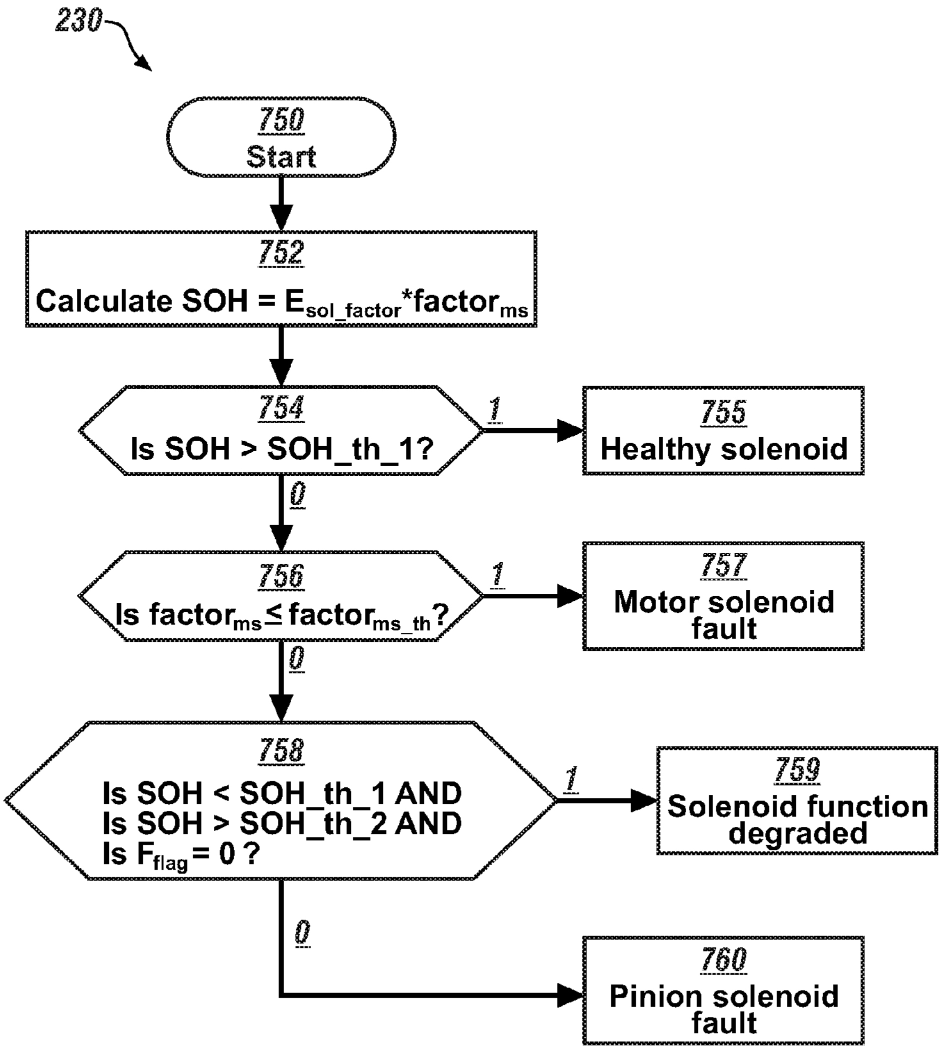
FIG. 12 illustrates a routine for determining and evaluating the starter solenoid SOH, in accordance with the disclosure.

FIG. 12 schematically depicts the third routine 230 in flowchart form for determining and evaluating the starter solenoids SOH. The third routine 230 is preferably executed in the control module 50 as one or more routines and associated calibrations. Table 6 is provided as a key to FIG. 12 wherein the numerically labeled blocks and the corresponding functions are set forth as follows.

TABLE 6

| FIG. 12 | |
|---|---|
| BLOCK | BLOCK CONTENTS |
| 750 | Start |
| 752 | Calculate SOH = $E_{sol\_factor}$ *$factor_{ms}$ |
| 754 | Is SOH > SOH_th_1? |
| 755 | Healthy solenoid |
| 756 | Is $factor_{ms} \leq factor_{ms\_th}$? |
| 757 | Motor solenoid fault |
| 758 | Is SOH < SOH_th_1 AND<br>Is SOH > SOH_th_2 AND<br>Is $F_{flag}$ = 0 ? |
| 759 | Solenoid function degraded |
| 760 | Pinion Solenoid fault |

Upon initiating the routine (750) the third routine 230 calculates a solenoids SOH (752) in accordance with the following relationship:

$$SOH=E_{sol\_factor}*factor_{ms} \quad [8]$$

wherein $E_{sol\_factor}$ is the solenoids energy factor, and $factor_{ms}$ is the motor solenoid factor.

The solenoids SOH is compared to a first threshold (SOH_th_1) (754) and when the solenoids SOH is greater than the first threshold (754)(1), the solenoids are deemed functional and healthy (755).

When the solenoids SOH is not greater than the first threshold (754)(0), operation continues by comparing the motor solenoid factor ($factor_{ms}$) with a threshold factor ($factor_{ms\_th}$) (756). When the motor solenoid factor is less than or equal to the threshold factor (756)(1), a motor solenoid fault is detected (757).

When the motor solenoid factor is not less than or equal to the threshold factor (756)(0), the solenoids SOH is compared to the first threshold (SOH_th_1) and a second threshold (SOH_th_2), and the fault flag $F_{flag}$ is evaluated (758). When the solenoids SOH is less than the first threshold and greater than the second threshold, and the fault flag is "0" (758)(1), it is determined that the solenoids function has degraded. The first threshold and the second threshold are determined based upon an evaluation of starters employing solenoids having induced faults that are correlated to an ability to execute engine starting under different operating conditions, and a corresponding determination of starter solenoids SOH and based on solenoid energy needed for during its operation until engine starts. When the solenoids SOH is not less than the first threshold or not greater than the second threshold, or the fault flag is not "0" (758)(0), a fault with the pinion solenoid is detected (760). In this manner, the routine described herein can detect degradation in the solenoids caused by overheating, faults associated with a pinion solenoid electrical wiring shorts, brush wear and motor solenoid faults.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring pinion and motor solenoids of an electrically-powered motor for a starter of an internal combustion engine, comprising:

initiating an engine starting event, comprising:

electrically connecting a starter motor to a battery; and activating said motor solenoid to cause the starter motor to spin with corresponding activation of said pinion solenoid to urge a shaft and a pinion gear into engagement with a starter ring gear portion of a flywheel of the internal combustion engine; and within a controller:

monitoring current and electrical energy consumed by said pinion and motor solenoids of the starter during said engine starting event;

determining electrical energy consumed by the pinion and motor solenoids during the engine starting event;

monitoring current ringing associated with activation of the pinion and motor solenoids during the engine starting event, the current ringing comprising a quantity of current oscillations and a magnitude of the current oscillations; and identifying a fault in one of the pinion solenoid and the motor solenoid based upon the current ringing and the electrical energy consumed by the pinion and motor solenoids during the engine starting event; and permitting subsequent engine starting events based on the identified fault.

2. The method of claim 1, wherein determining the electrical energy consumed by said pinion and motor solenoids during the engine starting event comprises:

monitoring battery voltage and current flow through the pinion and motor solenoids during activation of the motor solenoid prior to activation of the pinion solenoid;

determining an equivalent resistance of the pinion and motor solenoids based upon said battery voltage and current flow;

determining current flow during the engine starting event based upon the equivalent resistance of the pinion and motor solenoids; and determining solenoid energy based upon the current flow during the engine starting event.

3. The method of claim 2, wherein determining solenoid energy based upon the current flow during the engine starting comprises integrating a term comprising the current flow multiplied by battery voltage during the engine starting event.

4. The method of claim 2, wherein determining the electrical energy consumed by pinion and motor solenoids during the engine starting event further comprises:

adjusting the equivalent resistance of the pinion and motor solenoids based upon temperature;

determining current flow during the engine starting event based upon the temperature-adjusted equivalent resistance of the pinion and motor solenoids; and determining solenoid energy based upon the current flow during the engine starting event.

5. The method of claim 1, wherein identifying a fault in the pinion solenoid based upon the current ringing and the electrical energy consumed by the pinion and motor solenoids during the engine starting event comprises identifying a fault in the pinion solenoid when the electrical energy consumed by the pinion and motor solenoids during the engine starting event is greater than a threshold.

6. The method of claim 1, wherein identifying a fault in the motor solenoid based upon the current ringing and the electrical energy consumed by the pinion and motor solenoids during the engine starting event comprises identifying a fault in the motor solenoid when the current ringing is greater than a threshold during the engine starting event.

7. The method of claim 1, further comprising:

determining a state of health (SOH) of the pinion and motor solenoids based upon the current ringing and the electrical energy consumed by the pinion and motor solenoids; and identifying a motor solenoid fault when the SOH of the pinion and motor solenoids is less than a first threshold and a time factor correlated to the current ringing is less than a threshold and identifying a pinion solenoid fault when the SOH of the pinion and motor solenoids is less than the first threshold and the electrical energy consumed by the pinion and motor solenoids during the engine starting event is greater than a threshold.

* * * * *